UNITED STATES PATENT OFFICE.

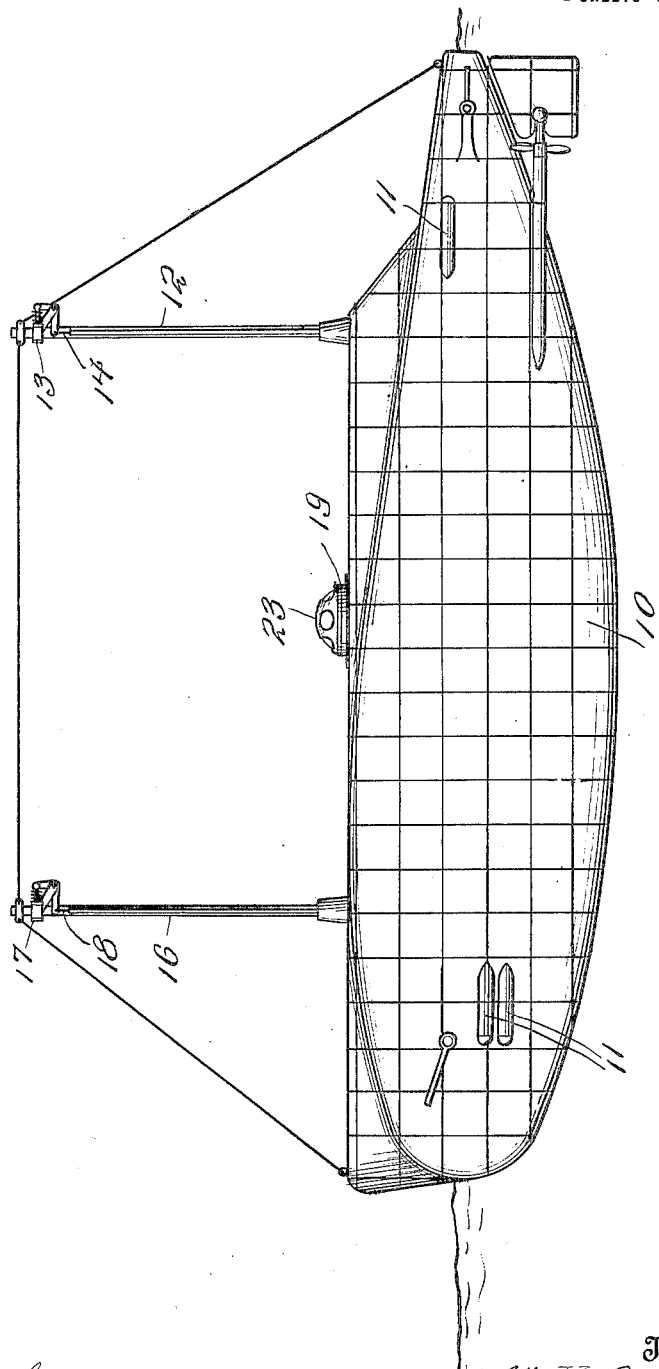

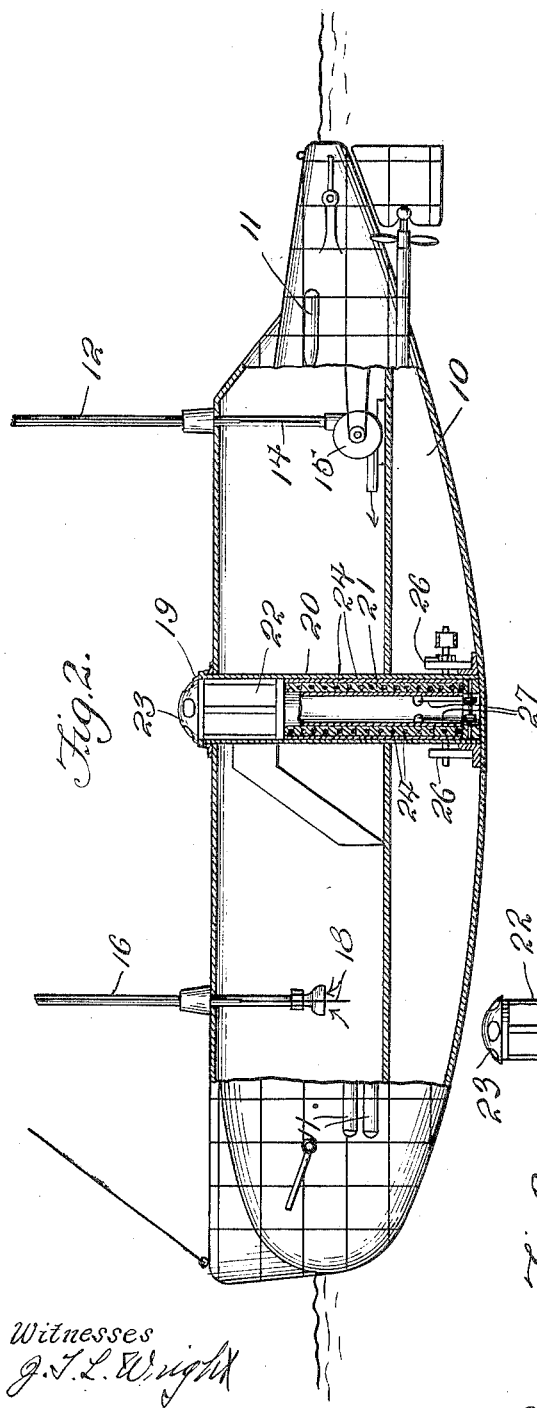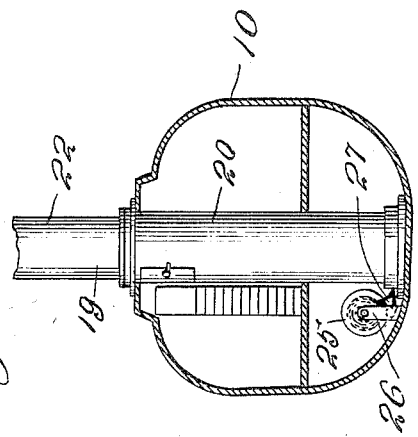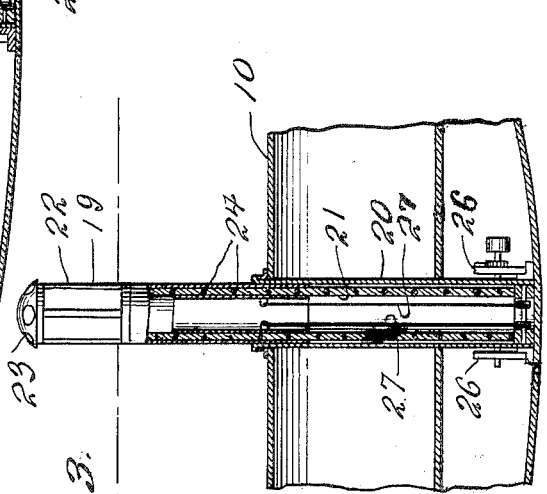

WILLIAM H. COLLIER, OF YATESVILLE, GEORGIA.

SUBMARINE.

1,345,836.   Specification of Letters Patent.   Patented July 6, 1920.

Application filed November 1, 1918. Serial No. 260,717.

*To all whom it may concern:*

Be it known that I, WILLIAM H. COLLIER, a citizen of the United States, residing at Yatesville, in the county of Upson and State of Georgia, have invented new and useful Improvements in Submarines, of which the following is a specification.

This invention relates to submarine vessels and aims to provide means whereby a vessel may travel sufficiently far beneath the surface of the water as to be invisible from above and at the same time provide means whereby the occupants of the vessel may obtain a view of the surrounding surface of the water.

The primary object of the invention is to provide means whereby a submarine may be maintained to travel for an indefinite period beneath the water's surface at a depth to be invisible from above, with a look out tower arranged so that a clear view of the surrounding surface of the water may be obtained, the tower being so constructed as to be practically invisible at a distance and being capable of collapsing within the vessel when necessary. This saves time in escaping from an enemy vessel, as the time required for collapsing the tower is considerably less than for submerging.

Other objects and advantages of the invention will appear as the following description is read in connection with the accompanying drawings, in which:—

Figure 1 is an elevation of a submarine vessel constructed in accordance with the present invention, the look out tower being shown in its collapsed position;

Fig. 2 is a longitudinal sectional view of the same;

Fig. 3 is a fragmentary sectional view with the tower extended.

Fig. 4 is a section at right angles to Fig. 3 the tower being shown in elevation.

Referring to the drawings in detail, the hull of the vessel is shown at 10, its outer surface being camouflaged by covering the surface with checker board design, so that when the vessel is not submerged it will be rendered less prominent. The hull is also provided at each end thereof with torpedo tubes 11.

As previously stated it is the purpose of the invention to provide a vessel which may travel for an indefinite period beneath the surface of the water and for this purpose one end of the vessel has extending therefrom an air intake pipe or conduit 12, one end communicating with the interior of the vessel and the other end open to the atmosphere. This pipe is controlled by a valve 13 located near its outer end, a valve rod or cord 14 connected to the valve and extending within the interior of the vessel, providing means for controlling the valve. Located within the vessel at the inner end of the pipe or conduit 12 is a suction fan 15, which is driven from the power used for operating the boat. From the opposite end of the hull there projects an exhaust pipe or conduit 16, which is controlled by a valve 17, similar to the valve 13 and like this valve is operated from the interior of the vessel through the medium of a valve rod or cable 18.

In order that the occupants of the vessel may acquaint themselves with the surrounding surface of the water through which the vessel is traveling, there is provided a look out tower 19. This tower is preferably cylindrical in form and is constructed in sections, a metallic section 20 extending normally within the hull of the vessel at a suitable point, preferably midway between the bow and stern. This metallic section 20 communicates with the interior of the hull and has slidable therein a flexible section 21, preferably formed of rubber or other material impervious to the water. Connected to the section 21 is a section 22 formed of glass or other transparent material, the said section being provided with a closed spherical or globular end 23. The section 21 normally collapses within the section 20.

The tower is extended through the medium of expansible springs 24 which are embedded within the section 21, and is retracted by means of a windlass 25, mounted in suitable bearings 26 located within the hull of the vessel. The windlass 25 is connected to the tower through cables 27, so that by driving the windlass to wind these cables thereon the tower is collapsed. This collapsing is effected by compressing the springs through the operation of the windlass and cables, whereupon the section 21 will be folded throughout its length.

It is believed that when the foregoing description is read in connection with the accompanying drawings, the construction, operation and advantages of the invention will be apparent. The invention is susceptible of various changes in its form, proportions and minor details of construction and the right is reserved to make such changes.

Having described the invention, what is claimed is:—

1. In a submarine vessel, a collapsible tower extending from the hull of the vessel and communicating with the interior thereof, means for extending the tower and means for collapsing the same to house the tower within the hull.

2. In a submarine vessel, a collapsible tower extending from the hull of the vessel and communicating with the interior thereof, automatic means for extending the tower, and means for collapsing the same to house the tower within the hull.

3. In a submarine vessel, a collapsible tower extending from the hull of the vessel and communicating with the interior thereof, means for extending the tower and means operated from the interior of the hull of the vessel for collapsing the tower to house the same within the hull.

4. In a submarine vessel, a telescopic tower extending from the hull of the vessel and communicating with the interior thereof, means for extending the tower and means for collapsing the same to house the tower within the hull.

5. In a submarine vessel, a collapsible tower extending from the hull of the vessel and communicating with the interior thereof, said tower including a flexible section, means for extending the tower and means for collapsing the same to house the tower within the hull.

6. In a submarine vessel, a collapsible tower extending from the hull of the vessel and communicating with the interior thereof, spring means for automatically extending the tower and means for collapsing the same and housing the tower within the hull.

7. In a submarine vessel, a collapsible tower extending from the hull of the vessel and communicating with the interior thereof, a transparent section provided at the outer end of the tower, means for extending the tower and means for collapsing the same to house the tower within the hull.

In testimony whereof I affix my signature.

WILLIAM H. COLLIER.